United States Patent [19]

Rockenfeller et al.

[11] Patent Number: 4,718,802
[45] Date of Patent: Jan. 12, 1988

[54] SAWTOOTH-PROFILE NAIL

[75] Inventors: Gottfried Rockenfeller, Hilchenbach; Wolfgang Rockenfeller, Hilchenbach-Helberhausen, both of Fed. Rep. of Germany

[73] Assignee: Rockenfeller KG Befestigungselemente, Hilchenbach, Fed. Rep. of Germany

[21] Appl. No.: 861,157

[22] Filed: May 8, 1986

[30] Foreign Application Priority Data

May 8, 1985 [DE] Fed. Rep. of Germany ....... 3516479

[51] Int. Cl.$^4$ ........................................... F16B 35/04
[52] U.S. Cl. ..................................... 411/421; 411/455
[58] Field of Search ............... 411/450, 451, 452, 453, 411/454, 455, 456, 446, 487, 489, 420, 421, 394, 399

[56] References Cited

U.S. PATENT DOCUMENTS

| 1,022,106 | 4/1912 | Murphy | 411/455 X |
| 2,028,528 | 1/1936 | Sipe | 411/455 |
| 2,649,831 | 8/1953 | Anstett | 411/451 |
| 2,867,807 | 1/1959 | Anstett . | |
| 4,219,980 | 9/1980 | Loyd . | |

FOREIGN PATENT DOCUMENTS

| 36303 | 2/1909 | Austria | 411/455 |
| 657685 | 3/1938 | Fed. Rep. of Germany | 411/451 |
| 1115528 | 10/1961 | Fed. Rep. of Germany . | |
| 2038885 | 3/1974 | Fed. Rep. of Germany . | |
| 7226142 | 5/1974 | Fed. Rep. of Germany . | |
| 2507545 | 8/1975 | Fed. Rep. of Germany . | |
| 3042463 | 5/1982 | Fed. Rep. of Germany . | |
| 545908 | 4/1922 | France | 411/455 |
| 759613 | 11/1933 | France | 411/451 |
| 13782 | 12/1896 | Switzerland | 411/456 |
| 480155 | 12/1969 | Switzerland | 411/451 |
| 113819 | 5/1918 | United Kingdom | 411/456 |
| 629722 | 9/1949 | United Kingdom | 411/453 |
| 646246 | 11/1950 | United Kingdom | 411/454 |

Primary Examiner—Lloyd A. Gall
Attorney, Agent, or Firm—Karl F. Ross; Herbert Dubno

[57] ABSTRACT

A plasterboard, boat, flooring underlayment or like ridged nail is provided with a taper of its sawtooth profile toward the point of the nail. The crests of the ridges can lie along one imaginary cone converging toward the point while the roots of the ridges lie along another imaginary cone equidistant from the first or converging toward the crest cone in the direction of the point. Steep-pitch helical flutes can be provided along the sawtooth portion especially when the nail is to be driven in hard materials.

8 Claims, 6 Drawing Figures

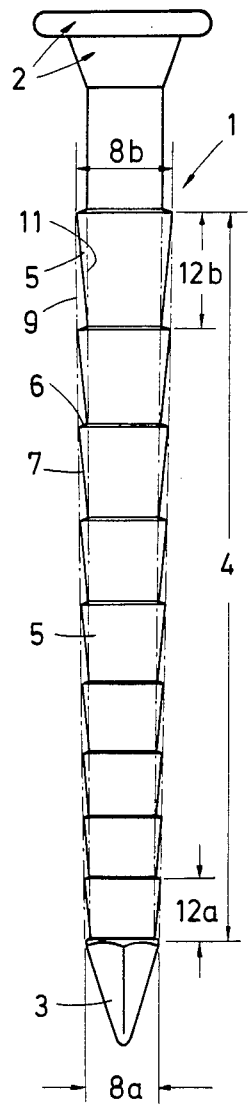
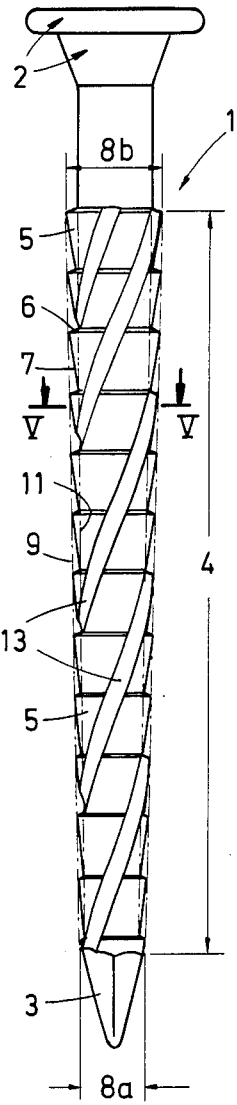
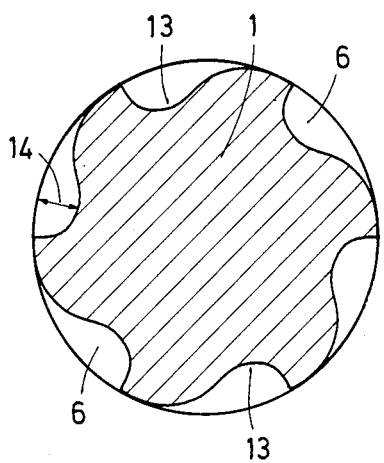

SAWTOOTH-PROFILE NAIL

FIELD OF THE INVENTION

Our present invention relates to a sawtooth-profile nail and, more particularly, to a so-called boat nail, flooring nail or underlayment nail which has a multiplicity of annular ridges between a head and a point shaped to provide a sawtooth profile so that the nail can be driven easily into place but does not work out of its position easily and cannot be withdrawn with ease. More particularly, the invention relates to a nail having a shaft or elongate body formed with a head at one end, a point at the opposite end and ribs of frustoconical configuration having a steep flank turned toward the head, a shallow flank turned toward the point, and so formed on the body or shank as to generate a sawtooth profile adjacent the point and extending toward the head.

BACKGROUND OF THE INVENTION

Ridged shank nails are used where it is desired to preclude the nails from working loose from the boards, planks or the like into which the nails have been driven.

These nails are used for wallboard, as boat nails and as a flooring or underlayment nails, by way of example, and may conform to the German UIC commercial standard 435-2 in which they are identified as convex ring nails.

Once driven into place, these nails hold tightly against withdrawing forces and even forces tending to separate the planks or boards in which the nail may be embedded. In general the locking action derives from the fact that the material, usually wood or wallboard such as plasterboard, in which the nail is driven is somewhat elastic and is deflected outwardly by the nail as it is driven into place, the material springing back into the annular grooves defined between the adjacent ridges so that the steep flanks of the ridges cannot as easily deflect the material upon retraction of the nail. The result is a barb-like engagement of the nail in the material over the entire sawtooth profile of the length of the shaft or body provided with the ridges between the point and the head.

In practice, however, it is found that while the nails provided heretofore and in which the ridges all had crests of the same diameter so that they lie along an imaginary cylindrical surface coaxial with the nail, have been found to be satisfactory by and large, in many cases the springback action is less than fully effective so that the desired degree of antiextraction strength is not reached.

OBJECTS OF THE INVENTION

It is the principal object of the present invention to provide an improved nail of the type described whose anchorage in the material in which it is driven is increased.

Another object of the invention is to provide an improved sawtooth-profile nail which eliminates the drawbacks enumerated above.

SUMMARY OF THE INVENTION

We have now discovered the aforedescribed earlier nails did not realize fully their possibilities with respect to the force with which they could be anchored in the material into which the nail was driven, largely because the ridges toward the point tended to so deform the material as to prevent it from springing back effectively into the grooves defined between the ridges, in part because successive ridges of the same diameter was rapidly contacted and engaged the material as to deform it plastically, tear it or otherwise overstress the material so as to prevent the springback action from being fully effective.

We have found that it is possible, moreover, to modify these earlier nail constructions so that the material is not excessively stressed and an effective springback action will be generated over the entire sawtooth profile of the nail when the crest diameter of the ridges progressively decreases toward the point. In this manner, each crest earlier encountering the material, as the nail is driven into a plank or wallboard will not deform the material to the same extent as the subsequent crests, in succession, and thus the springback action over the entire sawtooth profile of the nail remains effective and an optimum anchoring effect of the ridges in the material is obtained.

According to the invention, therefore, the nail comprises an elongated metal body;

a nail head formed on one end of the body;

a nail point formed on an opposite end of the body and converging from a crest to a tip; and a plurality of mutually adjoining annular ridges of generally frustoconical configuration formed on the body and imparting thereto a sawtooth profile over a major portion of the length of the body from the point and each tapering toward the point so as to have a crest and a root, the ridges being of generally triangular cross section and each having a relatively steep flank turned toward the head and a relatively shallow flank turned toward the point, a one of the ridges most distal from the point having a crest diameter greater than the crest diameter of the nail point, the crests of the ridges between the most-distal ridge and the point lying along an imaginary conical root surface converging toward the point.

The resulting tapered nail can be driven into the plank or plasterboard more easily but with less disruption of the elastic restoring characteristics of the surrounding material so that, when the nail is fully ensconced in this material, the deformed portions thereof can spring back into the grooves or crevices between the ridges and hold the nail in place with an optimum barb-like action.

According to a feature of the invention a one of the ridges most proximal to the nail point has a root diameter less than the root diameter of the most-distal ridge and the roots of the ridges lie along an imaginary conical root surface converging toward the point. Especially effective anchorage has been found to be obtainable when the imaginary conical root surface and the imaginary conical root surface have different cone apex angles.

Fabrication of the nail is facilitated when the ridges have an interridge axial spacing pitch which decreases in increments between the end of the sawtooth profile turned toward the head and the end of the sawtooth profile turned toward the point.

In this form the initial cylindrical shaft of a nail body can be readily rolled to provide the sawtooth profile. It is advantageous when the pitch at the end of the sawtooth profile turned toward the head is twice the pitch at the end of the sawtooth profile turned toward the point.

In all cases it is advantageous when the sawtooth profile extends over at least half the length of the body.

It has been found to be advantageous, moreover, especially when the nail is to be driven into hard materials, such as concrete, to provide at least one steep-pitch helical flute formed in the sawtooth profile over the length thereof. Preferably, a plurality of steep-pitch helical flutes are provided in circumferentially equispaced relationship in the sawtooth profile.

During driving of the nail into hard materials, these flutes impart a rotation to the nail which intensifies the lodging and anchoring of the nail in the material.

A nail of this type, for maximum anchorage has flutes whose minimum depth is equal to the smallest depth between ridges of the sawtooth profile. For optimum effectiveness, the imaginary conical surfaces have different conicity angles and the flutes have a depth increasing toward the head corresponding to a change in the difference of the radii of the surfaces toward the head.

Advantageously the body has a slightly greater diameter in the region of the steep-pitch helical flutes at the point than at the end of the sawtooth profile turned toward the head.

With respect to a nail having helical flutes, reference may be had to German patent document-printed application DE-AS No. 20 38 885.

We have found that, While the nail of the invention has a sharply increased resistance to self-loosening by comparison with nails in which the crest diameters of the ridges lie along a cylinder and the root diameters of the ridges are equal, there is little additional resistance to the intentional withdrawal of the nail, e.g. by the claw of a hammer.

BRIEF DESCRIPTION OF THE DRAWING

The above and other objects, features and advantages of the present invention will become more readily apparent from the following description, reference being made to the accompanying drawing in which:

FIG. 3 is an elevational view of still another tapered ridged nail in accordance with the invention;

FIG. 4 is an elevational view of a fluted nail in accordance with the invention;

FIG. 5 is a cross section taken along the line V—V of FIG. 4; and

SPECIFIC DESCRIPTION

Figure 1:
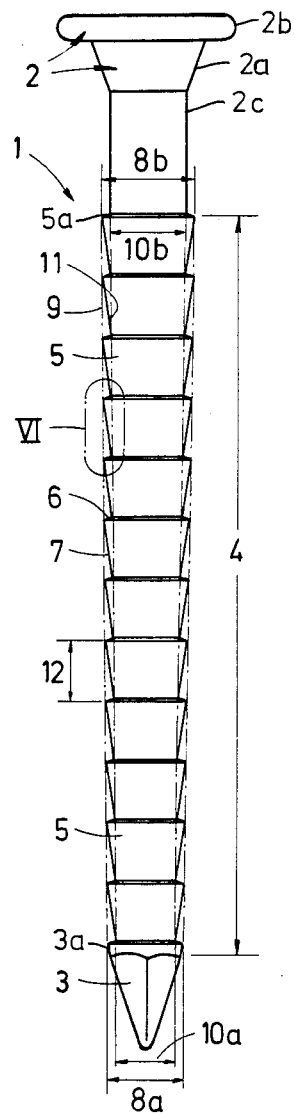
FIG. 1 is an elevational view of a nail in accordance with the present invention.

From FIGS. 1–4 it can be seen that the nail of the invention comprises a shaft or body 1, one end of which is formed with a head 2 including a frustoconical portion 2a and flange 2b adjoining a smooth cylindrical shank 2c. At the opposite end the shaft or body 1 is formed with a point 3.

Figure 6:
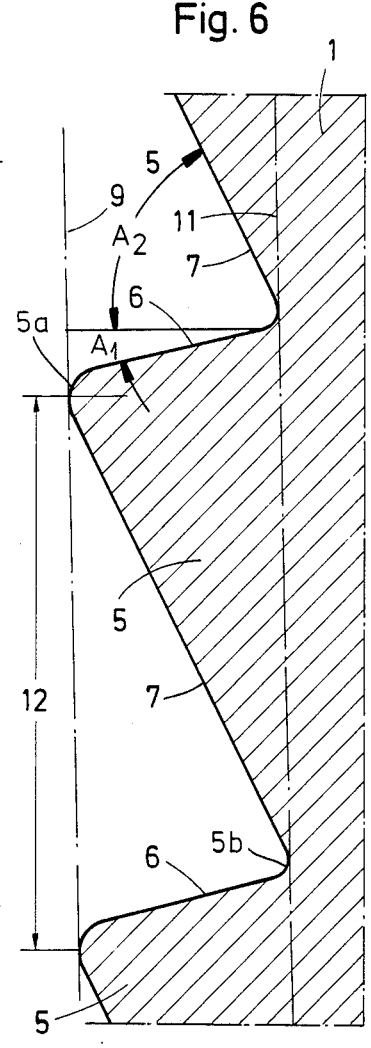
FIG. 6 is a section taken in the region VI—VI of FIGS. 1 and 2 but also illustrating the ridge profile applicable to FIGS. 3 and 4.

Over at least half the length of the shaft or body 1, each of the nails is provided with a sawtooth profile region 4 formed by adjoining ridges 5 which are annular and frustoconical in configuration. Each of these ridges (see FIG. 6) has a relatively steep flank 6 including an angle to, say, zero to 17° with a plane perpendicular to the axis or nail as represented at $a_1$ in FIG. 6. The steep flank faces the head 2. In addition, each ridge has a shallow flank 7 turned toward the point and including an angle $A_2$, of, for example, 63° to 67°.

Preferably the length 4 of the sawtooth profile is in a ratio to the total length of the nail body 1 of 0.8:1.

It has been found to be especially important, in accordance with the invention, that the crest diameter 8a of the crest 3a of the point 3 adjoining the ridge 5 most proximial to the point, is smaller than the diameter 8b of the crest 5a of the ridge 5 most distal from the point.

Furthermore, the crest diameters of the ridges diminish progressively in increments along the length of the nail so that the crests of the ridges lie along an imaginary conical surface 9 which is coaxial with the nail and converges toward the point. The angle of conicity, i.e. the apex angle of the cone 9 is relatively small, say less than 5° but greater than 1°, so that the difference between the diameters 8a and 8b is likewise comparatively small.

In all of the embodiments, moreover, the root 5b of each ridge 5 lies along the imaginary conical root surface 11. The root diameter 10a of the ridge most proximal to the point 3 is less than the root diameter 10b of the ridge most distal from the point and the imaginary cone 11 is coaxial with the imaginary cone 9 and likewise converges in the direction of the point.

In the embodiment of FIG. 1, the root diameters 5b decrease in the same relationship as the crest diameters of the ridges toward the point and the two cones 9 and 11 are equidistant from one another over the length of the nail.

Figure 2:
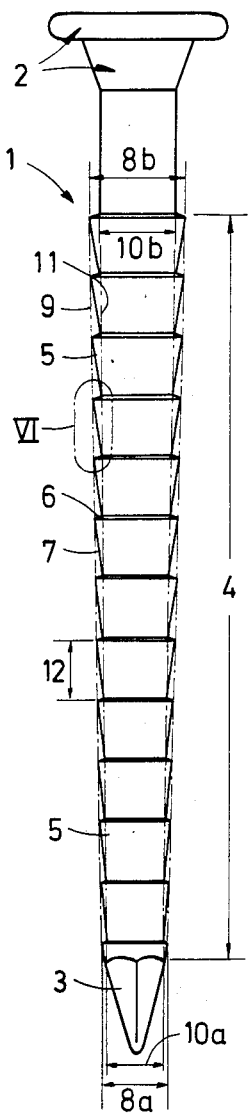
FIG. 2 is a similar view of a nail in accordance with another embodiment thereof.

However, in the embodiments of FIG. 2–4, the imaginary crest cone 9 has an apex angle which is slightly greater than the apex angle of the imaginary root cone 11 so that the two cones approach each other toward the point, i.e. converge.

Furthermore, while in the embodiment of FIG. 1 the steeply inclined flanks 6 of all ridges have the same breadth, in the embodiments of FIGS. 2–4 the steeply inclined flanks 6 are of progressively reduced breadth from ridge to ridge toward the point.

In the embodiments of FIGS. 1, 2 and 4, the pitch of the ridges is uniform along the length of the sawtooth portion 4, i.e. the interridge spacing is equal over the length of the nail. By contrast, in the embodiment of FIG. 3, the interridge spacing 12a at the point end of the sawtooth portion 4 is less than the interridge spacing 12b at the opposite end of the axial length as the ridges decrease stepwise from ridge to ridge in the direction of the point. Indeed, the pitch 12b at the head end can be twice the pitch 12a at the point end. This has been found to facilitate rolling the ridges in a cylindrical blank. With the embodiments of FIGS. 1, 2 and 4, a tapered blank is used.

It has been found to be advantageous to provide a diameter 8b proximal to the head of 5 mm and a diameter 8a toward the point of about 4.5 mm, and to maintain these proportions for other sizes of nails. In the case of the embodiments of FIG. 3, the pitch 12b can be 2 mm while the pitch 12a is 1 mm. As indicated, the pitch increases toward the head at a rate proportional to the distance from the point 3 and thus each ridge 5 has a length different from that of the other ridges.

The crests 5a of the ridges are rounded (see FIG. 6) as are the roots 5b, although the crests can be also chamfered as desired.

The nails of FIGS. 1–3 can be used in wood, leather or like relatively flexible materials to great advantage, whereas for concrete we prefer to provide, as can be seen from FIG. 4, along the toothed profiles 4 of the nails, a plurality of circumferentially equispaced, steep-pitch helical flutes 13 which can have an involute cross section as shown in FIG. 5.

The depth 14 of the grooves forming the flutes 13 should be equal to the smallest depth of the ridges 5 which have been provided and advantageously the depth 14 can vary along the length of the nail in accordance with the difference between the crest and root surface diameters. Nails of the type shown in FIGS. 4 and 5 have the advantage that when driven into hard materials by the hammer develop autorotation because of the flutes and superimpose a screw-type anchorage on the sawtooth anchorage provided by the ribs 5.

The nail of FIG. 4 utilizes a ridge configuration which is basically that of FIG. 2, but such flutes can also be employed in the embodiments of FIGS. 1 and 3.

It has been found advantageous, moreover, to have the flute teeth proximal to the point 3 lie along a circle having a slightly greater diameter than that of the circle of the flute teeth proximal to the head 1.

We claim:

1. A nail comprising:
   an elongated metal body;
   a nail head formed on one end of said body;
   a nail point formed on an opposite end of said body and converging from a crest to a tip;
   a plurality of mutually adjoining annular ridges of generally frustoconical configuration formed on said body and imparting thereto a sawtooth profile over a major portion of the length of said body from said point and each tapering toward said point so as to have a crest and a root, said ridges being of generally triangular cross section and each having a relatively steep flank turned toward said head and a relatively shallow flank turned toward said point, a one of said ridges most distal from said point having a crest diameter greater than the crest diameter of said nail point, said crests of the ridges between said most-distal ridge and said point lying along an imaginary conical crest surface converging toward said point, a one of said ridges most proximal to said nail point having a root diameter less than the root diameter of said most-distal ridge and the roots of said ridges lying along an imaginary conical root surface converging toward said point, a plurality of steep-pitch helical flutes being formed to cross said ridges in said sawtooth profile over the length thereof, said flutes having a maximum depth along the the lengths thereof equal to the difference between the root and crest radii of the ridges crossed thereby.

2. The nail defined in claim 1 wherein said imaginary conical crest surface and said imaginary conical root surface have different cone apex angles.

3. The nail defined in claim 1 wherein said ridges have an interridge axial spacing pitch which decreases in increments between the end of the sawtooth profile turned toward said head and the end of said sawtooth profile turned toward said point.

4. The nail defined in claim 3 wherein said pitch at the end of the sawtooth profile turned toward said head is twice the pitch at the end of said sawtooth profile turned toward said point.

5. The nail defined in claim 1 wherein said sawtooth profile extends over at least half the length of said body.

6. The nail defined in claim 1 wherein said conical crest and root surfaces have the same conicity angles.

7. The nail defined in claim 1 wherein said conical crest and root surfaces converge toward each other in the direction of said point.

8. The nail defined in claim 1, further comprising a smooth shank formed on said body between said sawtooth profile and said head.

* * * * *